us009204326B2

United States Patent
Bommer et al.

(10) Patent No.: US 9,204,326 B2
(45) Date of Patent: Dec. 1, 2015

(54) ONBOARD WIRELESS PERFORMANCE TESTING

(75) Inventors: Jason P. Bommer, Tacoma, WA (US); Keith J. Glover, Kent, WA (US); Arun Ayyagari, Seattle, WA (US); Sudhakar S. Shetty, Newcastle, WA (US); David T. Kirkland, Kent, WA (US); Scott E. Marston, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 413 days.

(21) Appl. No.: 13/562,789

(22) Filed: Jul. 31, 2012

(65) Prior Publication Data

US 2014/0036686 A1 Feb. 6, 2014

(51) Int. Cl.
| | |
|---|---|
| *H04J 1/16* | (2006.01) |
| *H04W 24/06* | (2009.01) |
| *H04L 12/24* | (2006.01) |
| *H04W 16/20* | (2009.01) |
| *H04W 84/00* | (2009.01) |

(52) U.S. Cl.
CPC .............. *H04W 24/06* (2013.01); *H04L 41/145* (2013.01); *H04W 16/20* (2013.01); *H04W 84/005* (2013.01)

(58) Field of Classification Search
CPC ..................... H04M 1/72519; H04M 1/72538; H04M 2250/12; H04W 4/04; H04W 84/18; H04W 74/0808; H04W 74/0816; H04W 24/10; H04W 4/005; H04W 4/008; H04W 4/023; H04W 4/028; H04W 72/12; H04W 84/005
See application file for complete search history.

(56) References Cited

U.S. PATENT DOCUMENTS

| | | | |
|---|---|---|---|
| 2003/0156549 A1 | 8/2003 | Binder et al. | |
| 2009/0042557 A1* | 2/2009 | Vardi et al. | ................. 455/422.1 |
| 2009/0248366 A1* | 10/2009 | Scheid et al. | ................. 702/188 |
| 2010/0318243 A1 | 12/2010 | Lewis et al. | |
| 2011/0018686 A1 | 1/2011 | Fahley et al. | |
| 2011/0032826 A1 | 2/2011 | Kim et al. | |
| 2012/0106537 A1 | 5/2012 | Yousefi et al. | |

FOREIGN PATENT DOCUMENTS

EP     1 838 119 A1    9/2007

OTHER PUBLICATIONS

European Search Report dated Feb. 6, 2014 for European Application No. 13 174 076.3, 8 pages.
Debono et al., "Optimization of the UMTS Network Radio Coverage On-board an Aircraft," IEEE, Aerospace Conference, 2008, 7 pages.
Hankins et al., "Electromagnetic Propagation Prediction Inside Aircraft Cabins," IEEE (vol. 3), Jun. 2004, pp. 2227-2230.
Hankins et al., "802.11ab Propagation Prediction inside a B777," IEEE/ACES, Apr. 2005, pp. 837-840.

* cited by examiner

*Primary Examiner* — Chi H Pham
*Assistant Examiner* — Raul Rivas
(74) *Attorney, Agent, or Firm* — Womble Carlyle Sandridge & Rice LLP

(57) ABSTRACT

A method and associated wireless monitor and data analysis system are provided. The method includes installing one or more of a plurality of wireless monitors at respective locations onboard a complex system on which a wireless system of interest is installed or planned for installation. The method may then include by the plurality of wireless monitors, emulating the wireless system of interest, and recording data related to performance of the wireless system of interest at one or more recorded times over a plurality of operating conditions of the complex system. The method may also include by the plurality of wireless monitors, collecting data including the respective locations of the wireless monitors correlated with respective recorded data and recorded times. In this regard, the collected data for the plurality of wireless monitors may be retrievable for analysis of the wireless system of interest based thereon.

19 Claims, 5 Drawing Sheets

ONBOARD WIRELESS PERFORMANCE TESTING

TECHNOLOGICAL FIELD

The present disclosure relates generally to wireless system development and, in particular, to testing the performance of a configuration of a wireless system installed or planned for installation onboard a complex system such as an aircraft.

BACKGROUND

There are several planned wireless systems on commercial aircraft including WLAN (wireless local area network), cellular, RFID (radio frequency identification), in-flight entertainment, emergency lighting, a number of emerging aircraft health monitoring sensor systems and the like. Individually, each system must contend with a unique aircraft environment. For example, a particular fuselage structure or configuration of the cabin interior may make it difficult to determine the wireless channel characteristics and the overall performance in the aircraft. Temporal effects, such as moving passengers and crew, also complicate this and can have an impact on performance. The problem is exacerbated when multiple systems and protocols are forced to operate in close proximity, as is the case inside an aircraft. This results in concerns over unintentional interference and "data collision." Because of these factors, there can be a performance degradation with fielded wireless systems and they may not perform as expected.

Currently performance degradation is mitigated in fielded wireless systems through modeling and testing processes. Testing in this context generally involves measuring or estimating performance of a wireless system. Current methods of testing have a number of limitations. Testing processes are often carried out on a wireless system installed in a test vehicle selected out of convenience, but this vehicle rarely matches the specific configuration where the wireless system is to be installed. Furthermore, even when using state-of-the art equipment and experienced personnel, the testing may take an extended period of time. Further, standardization in test processes and data format for a specific type of system may make it more difficult to share common data that could be equally relevant for different types of wireless systems. The current test practices may make it difficult for programs to share test results, causing inefficiencies from a replication of effort.

Therefore, it may be desirable to have a method and apparatus that takes into account at least some of the issues discussed above, as well as possibly other issues.

BRIEF SUMMARY

Example embodiments of the present disclosure are generally directed to a system for testing performance of a configuration of a wireless system installed or planned for installation onboard a complex system such as an aircraft, and a corresponding method. Complex systems such as aircraft typically have a scheduled window of availability between the time they are assembled and delivered for testing, verifications and check-outs (which may currently not include wireless performance testing). The system and method of example embodiments may be designed to work within the constraints of existing test operations with minimal impact.

According to one aspect of example embodiments, a method is provided that includes installing one or more of a plurality of wireless monitors at respective locations onboard a complex system on which a wireless system of interest is installed or planned for installation. The method may then include by the plurality of wireless monitors, emulating the wireless system of interest, and recording data related to performance of the wireless system of interest at recorded time(s) over a plurality of operating conditions of the complex system. The method may also include by the plurality of wireless monitors, collecting data including the respective locations of the wireless monitors correlated with respective recorded data and recorded times. In this regard, the collected data for the plurality of wireless monitors may be retrievable for analysis of the wireless system of interest based thereon. The analysis may be performed by a data analysis system to establish a configuration of the wireless system of interest that meets or exceeds at least one design requirement thereof. In this regard, the data analysis system may compute whether the configuration or operating conditions of the complex system enable the wireless system of interest to perform with a wireless link quality specified by the design requirement(s). In one example, the wireless monitors recording data may include calculating a wireless link quality at the one or more recorded times over the plurality of operating conditions, which the data analysis computation may then be based on.

In one example, the collecting of data includes collecting respective recorded data further correlated with the plurality of operating conditions of the complex system at the recorded times. The collected data, then, may further include the plurality of operating conditions.

In one example, the method may further include by the plurality of wireless monitors, receiving or calculating parameter(s) that at least partially define the configuration of the wireless system of interest, or parameter(s) that at least partially define the configuration of the complex system. In this example, the collecting of data may further include collecting the parameter(s) of the wireless system of interest or complex system. The collected data may then further include the parameter(s) of the wireless system of interest or complex system.

In one example, the wireless monitors may be installed such that the wireless monitors are segregated from the wireless system of interest. In another example, the wireless monitors may be installed such that the wireless monitors are integrated into and piggyback on the wireless system of interest installed on the complex system.

The wireless system of interest may include wireless hardware components. In one example, then, the wireless monitors may be installed at location(s) onboard the complex system at which the wireless hardware components are installed or planned for installation, or at location(s) of external wireless hardware components with which the wireless hardware components are configured to communicate.

In one example, the collecting of data may include collecting data in a hub-and-spoke arrangement in which one designated wireless monitor functions as a hub monitor responsible for interrogating and receiving responses from other wireless monitor(s) functioning as node monitors. In another example, the collecting of data may include collecting data in a mesh arrangement in which one or more of the wireless monitors selectively function as a hub monitor or node monitor.

In one example, the installing, emulating and collecting may occur for a plurality of different configurations of the complex system, with each configuration being at least partially defined by parameters one or more of which differ for different configurations. Additionally or alternatively, for example, the installing, emulating and collecting may occur for a plurality of different configurations of the wireless system of interest, with each configuration of wireless system being at least partially defined by parameters one or more of which differ for different configurations.

In other aspects of example embodiments, a wireless monitor and data analysis system are provided. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the present disclosure in general terms, reference will now be made to the accompanying drawings, which are not necessarily drawn to scale, and wherein:

DETAILED DESCRIPTION

Figure 1:
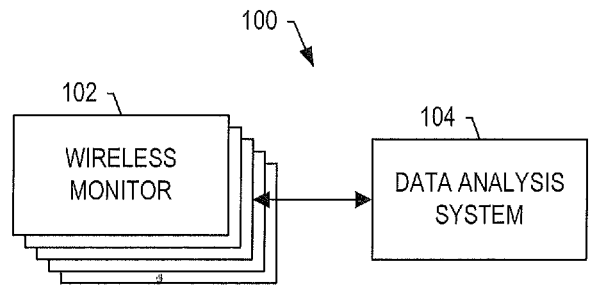
FIG. 1 is an illustration of a wireless performance testing system in accordance with an example embodiment.

Some embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

Example embodiments of the present disclosure relate generally to wireless system development and, in particular, to testing performance of a configuration of a wireless system installed or planned for installation onboard a complex system such as an aircraft. Example embodiments may be described herein with reference to a wireless system installed or planned for installation onboard an aircraft. It should be understood that example embodiments may be equally applicable to a wireless system installed or planned for installation onboard other complex systems, manufacturing/factory facilities, vehicles or the like, both in and out of the aerospace industry.

Referring now to FIG. 1, a wireless performance testing system 100 is illustrated according to example embodiments of the present disclosure. The system may include any of a number of different subsystems (each an individual system) for performing one or more functions or operations for testing the performance of one or more configurations of one or more wireless systems installed or planned for installation onboard a complex system such as an aircraft. As shown, for example, the system may include one or more wireless monitors 102 and a data analysis system 104. Although being shown as separate subsystems of the wireless performance testing system, the data analysis system may instead be integrated into one or more of the wireless monitors. Or the data analysis system may be implemented in a hierarchical computing environment where some of the processing may be performed locally at the wireless monitors while the aggregation globally may be performed at the data analysis system. It should also be understood that either or both of the wireless testing system may function or operate as a separate system without regard to the other. And further, it should be understood that the wireless performance testing system may include one or more additional or alternative subsystems than those shown in FIG. 1.

An aircraft or other similar complex system may be manufactured or retrofitted to include one or more wireless systems. Examples of suitable types of wireless systems include wireless local area network (WLAN), cellular, RFID (radio frequency identification), in-flight entertainment, emergency lighting, a number of emerging aircraft health monitoring sensor systems and the like. These wireless systems may include a number of wireless hardware components configured to operate in accordance with one or more of a number of different radio access technologies. Examples of suitable radio access technologies include 3rd Generation Partnership Project (3GPP) or 4th Generation Partnership Project (4GPP) radio access technologies such as 3rd Generation (3G), 3.9G, 4th Generation (4G) technologies or the like including, for example, UTRAN Long Term Evolution (LTE), LTE Advanced or the like. Examples of other suitable radio access technologies include Universal Mobile Telephone System (UMTS) radio access UTRA (Universal Terrestrial Radio Access), Global System for Mobile communications (GSM) radio access technologies, Code Division Multiple Access (CDMA) 2000 radio access technologies, WLANs such as IEEE 802.xx, e.g., 802.11a, 802.11b, 802.11g, 802.11n, etc., world interoperability for microwave access (WiMAX), IEEE 802.16, and/or wireless PANs (WPANs) such as IEEE 802.15, Bluetooth, low power versions of Bluetooth, infrared (IrDA), ultra wideband (UWB), Wibree, Zigbee or the like. In various examples, a number of these and other similar radio access technologies may employ any of a number of different smart antenna technologies such as multiple-input and multiple-output (MIMO) technologies in which multiple antennas may be employed to improve communication performance.

A wireless system may be installed onboard a complex system in one or more of a number of different configurations in which one or more parameters of the wireless system may differ. A configuration of a wireless system may be at least partially defined by one or more parameters of the wireless system. Examples of parameters of a wireless system that may differ between configurations include its radio access technology, modulation type (e.g., AM, FM, BPSK, QPSK, 64-QAM), carrier frequency (e.g., generally in the 10s of MHz to 74 GHZ and higher), antenna type and/or number, power level or the like.

Like the wireless system, an aircraft may be of any of a number of different types. Aircraft may also be manufactured in one or more models each of which may have one or more series and/or configurations. For example, The Boeing Company manufactures or has manufactured different models of commercial aircraft under model 7×7 designations including 707, 717, 727, 737, 747, 757, 767, 777 and 787. A configuration of aircraft may be at least partially defined by one or more of parameters of the aircraft. Different configurations of aircraft may include different wireless systems, or the same wireless system with different configurations. Examples of other parameters of an aircraft that may differ between configurations include fuselage construction, cabin layout (e.g., customer preference, seating-class arrangement), materials used in interior components (e.g., fiberglass or carbon-fiber panels, carpet types, seat construction with built-in fire-retardant material, insulation blankets) or the like.

In addition to having any of a number of different configurations, aircraft may operate in any of a number of different conditions over a period of time. Examples of typical operating conditions include aircraft-level load state conditions such as empty or loaded with passengers and/or cargo, flight conditions such as on-ground with doors open at a gate, on-ground with maintenance crew or in-flight normal operation with passengers under various conditions (e.g., seated with belts fastened, roaming the cabin), or the like. Other examples of typical operating conditions include aircraft or system-level conditions such as temperature, active operation of one or more wireless systems or the like.

As indicated in the background section, a number of variables in an aircraft environment including an aircraft's configuration and/or operating conditions may affect performance of one or more wireless systems installed onboard the aircraft. As explained in greater detail below, one or more wireless monitors 102 of the wireless performance testing system 100 may be installable on a complex system such as an aircraft. The wireless monitor may be portable, small and easy to install and uninstall onboard the complex system, and may be further easily configured for operation. The monitor(s) may be configured to collect data related to performance of a wireless system installed or planned for installation onboard the complex system (wireless system of interest). As described herein, terms such as "collect," "record," "capture" or the like may be used interchangeably. The monitor may be capable of conforming to various installations to accommodate constraints of the complex system, and may operate in one or more modes so that its data collection may be optimized or biased to particular wireless systems of interest.

In one example, each monitor 102 may be installed at a location on an aircraft such as in its fuselage, and its location may be recorded on the monitor. As indicated above, interaction of a wireless system with its surrounding environment and/or the timing of that interaction may play important roles in its performance. Each monitor may therefore be configured to record data at regular intervals, and correlate the monitor's location with the recorded data and respective recorded times for a more thorough analysis of a wireless system of interest. Even further, for example, the recorded data may be correlated with one or more parameters of the wireless system of interest, one or more parameters of the aircraft and/or one or more operating conditions of the aircraft at the respective recorded times.

Data collected by each monitor 102 including the correlated location, recorded data and respective recorded times may be retrievable for analysis of the wireless system of interest. In this regard each wireless monitor may be configured to pass its collected data to the data analysis system 104, which may be generally configured to combine collected data from one or more monitors and perform an analysis of the wireless system of interest based on the respective data. Each monitor may be capable of collecting data at a required fidelity from a wireless environment, which may enable the data analysis system to combine data from a number of (one or more) monitors for analysis. In one example, the data analysis system may be configured to compile temporal RF spectrum cartography and/or wireless system performance within the airplane fuselage. In one example, the data analysis system may be used in an offline and/or batch processing mode to analyze data; but in another example, the data analysis system may be used in an online and/or individual processing mode. The analysis performed by the data analysis system may be used as a basis for one or more conclusions regarding the wireless system of interest. For example, the analysis may be performed to establish a configuration of the wireless system of interest that meets or exceeds at least one design requirement thereof. In this regard, the analysis may include computing whether the configuration or operating conditions of the complex system enable the wireless system of interest to perform with a wireless link quality specified by the design requirement(s). Then, from the conclusion(s), one or more decisions regarding the respective wireless system of interest, such as one or more decisions regarding its configuration, may be made.

Figure 2:
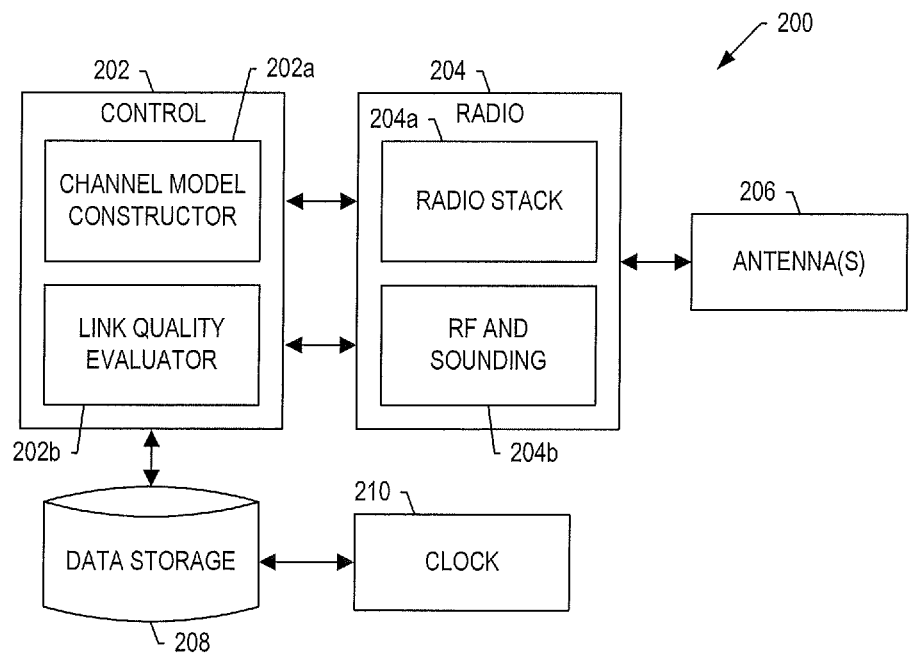
FIG. 2 is an illustration of a wireless monitor in accordance with one example embodiment.
Figure 3:
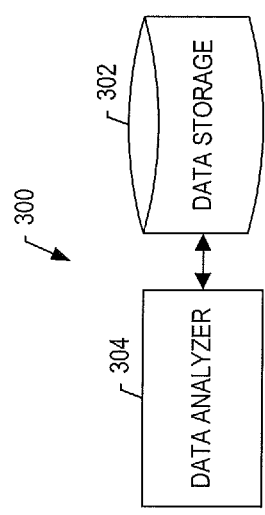
FIG. 3 is an illustration of a data analysis system in accordance with one example embodiment.

Reference will now be made to FIGS. 2 and 3, which illustrate more particular examples of a suitable wireless monitor 102 and data analysis system 104, respectively, according to example embodiments of the present disclosure.

FIG. 2 illustrates a wireless monitor 200 that may correspond to wireless monitor 102 according to one example embodiment. As shown, the wireless monitor may include a control module 202 coupled to a radio 204. The control module may be generally configured to control the radio to emulate any of one or more wireless systems of interest, and cause transmission of and receive data during operation of the wireless monitor. The control module may also be configured to collect or otherwise receive, measure or calculate other data based on the wireless system of interest and/or the data transmitted or received during operation of the wireless monitor.

In one example, data received or calculated by the control module 202 may include the location of the wireless monitor 200 onboard the complex system, which may be absolute or relative (e.g., relative to one or more other monitors) and acquired in any of a number of different manners. In various examples, the location coordinates of a monitor may be manually loaded during its installation. In other examples, the control module may automatically detect its own location in accordance with any number of positioning techniques such as global positioning system (GPS) or indoor GPS positioning/tracking systems, local positioning system (LPS) techniques or the like. In one example, the control module may be configured to determine its location based on one or more time-of-flight (TOF) measurements or received signal strength indicator (RSSI) values of transmitted impulse signals.

The data may include, for example, one or more parameters of the wireless system of interest, one or more parameters of the complex system on which the wireless module 200 is installed (e.g., aircraft type, manufacturer and/or model), or one or more operating conditions of the aircraft or other similar complex system. The data may also include, for example, data pertinent to the monitor, wireless system of interest or complex system. This pertinent data may include, for example, one or more maps and/or 3D models of the complex system, custom notes relevant to installation of the wireless monitor or the like. In one example, this data may be manually added by a technician setting up a test, but other, automated mechanisms may be additionally or alternatively employed. More particularly, for example, the technician may manually load data such as aircraft, interior layout, operating state, origin, destination or the like. Other data such as ambient temperature, pressure or the like may be automatically recorded and added to the data stream through augmented sensing.

In another example, the control module 202 may be configured to cause transmission of one or more messages or other signals, and receive appropriate responses, via the radio 204 and one or more appropriate antennas 206. These messages and responses may be between the wireless monitor and one or more other wireless monitors such as for performing a query/response, connectivity check, interrogation or the like. The control module may be even further configured to receive, measure or calculate one or more parameters of the messages or other signals and/or responses, examples of which are provided below.

As shown, the radio 204 may include a number of layers such as a radio stack 204a and an RF and sounding layer 204b. The radio stack may include or be otherwise configured to implement one or more radio access technologies of a respective one or more wireless systems, any of which may be a wireless system of interest. The radio stack may therefore be configured to emulate one or more wireless systems of interest. In one example, the radio stack may include a software-defined radio system.

The RF and sounding layer 204b of the radio 204 may be configured to function as the radio of an RF network analyzer to cause transmission of, receive and measure one or more network parameters of one or more waveforms (continuous wave and/or pulsed) via the antenna(s) 206. The parameters may in turn be received by the control module 202. The waveforms and parameters may be generated or otherwise selected according to any of a number of different wireless channel models. In one example, then, the control module may include channel model constructor 202a configured to construct one or more wireless channel models according to which the RF and sounding layer may be configured to operate to cause transmission of, receive and measure network parameters. Examples of suitable channel models include those based on s-parameters, impulse response, mean power, standard deviation of power, variance of power, fade, depth or the like.

In one example, the control module 202 may also include a link quality evaluator 202b configured to calculate the quality of a wireless link based on the parameters measured by the RF and sounding layer 204b of the radio 204 and received by the control module. The link quality indicator may be configured to calculate the quality in any of a number of different manners, and in one example, may do so also based on the wireless system of interest. For example, the link quality indicator may be configured to calculate received signal strength indicator (RSSI), data rate and/or packets sent/lost for a WLAN system of interest. In other examples, the link quality indicator may be configured to calculate RSSI for a cellular system of interest, or query versus response for an RFID system of interest. Other example measures of the quality of a wireless link may include channel capacity, bit error rate (BER), signal-to-noise ratio (SNR) or the like.

As also shown, the wireless monitor 200 may include data storage 208 coupled to the control module 202 and configured to store data collected by the wireless monitor, which may include data transmitted, received, measured and/or calculated by the wireless monitor. The control module 202 may be configured to collect data at regular intervals. The data storage may therefore store the monitor's location correlated with the recorded data and timestamps of recorded times of the recorded data. In addition, the data storage may store the recorded data correlated with one or more operating conditions of the complex system at the respective recorded times. In this regard, the storage device may be coupled to an appropriate clock 210, which in one example may be synchronized across a number of wireless monitors of the system.

Although shown as part of the wireless monitor 200, it should be understood that in other examples either or both of the channel model constructor 202a or link quality evaluator 202b may instead form part of a data analysis system or another external system, such as the data analysis system 104 of FIG. 1. In these other examples, a constructed channel model may be loaded onto the wireless monitor, and parameters from the RF and sounding layer 204b may be recorded for external calculation of wireless link quality.

Reference is now made to FIG. 3, which illustrates a data analysis system 300 according to one example embodiment. The data analysis system 300 may be one example of the data analysis system 104 of the wireless performance testing system 100 of FIG. 1. The data analysis system may be generally configured to receive a collection of data and perform an analysis of the respective data. As shown in FIG. 3, the data analysis system 300 may include a data storage 302 in which a collection of data may be stored, and a data analyzer 304 for retrieving the collection of data for performing one or more analyses of the wireless system of interest based thereon. This collection may be, for example, the collection from the wireless monitor 102, or more particularly in one example, the wireless monitor 200 of FIG. 2.

In one example, wireless monitors 102 (e.g., wireless monitors 200) may be configured to wirelessly transmit their data to the data analysis system 300 while onboard the complex system. In another example, the wireless monitors may be uninstalled from the complex system and then transmit their data to the data analysis system wirelessly or by wire. At some point, then, the monitors may be reset and installed on the same or another complex system for renewed operation.

As indicated above, for example, an analysis performed by the data analyzer 304 may include compilation of temporal RF spectrum cartography and/or wireless system performance within the airplane fuselage. The one or more analyses performed by the data analyzer may then be used as a basis for one or more conclusions regarding the wireless system of interest or one or more parameters of the wireless system of interest. These conclusions may even further be based on one or more parameters of the complex system (which may at least partially define its configuration), and/or one or more operating conditions of the complex system. For example, the analysis may be performed to establish a configuration of the wireless system of interest that meets or exceeds at least one design requirement thereof. In this regard, the analysis may include computing whether the configuration or operating conditions of the complex system enable the wireless system of interest to perform with a wireless link quality specified by the design requirement(s). The conclusions in turn may lead to one or more decisions regarding the respective wireless system of interest, such as one or more decisions regarding its configuration.

Any issues with the performance of the wireless system of interest with respect to a particular complex system (e.g., aircraft) and particular installation locations of the wireless monitors (e.g., wireless monitors 102) during the data acquisition period may be identified from the one or more analyses performed by the data analyzer 304. For example, performance may be characterized over a number of operating conditions that may or may not be detrimental (e.g., temperature, passenger movement, interfering systems, etc.).

To improve design and integration of a wireless system of interest as a whole, more tests may be desirable. Data acquisition and analysis may therefore be repeated on the same or different aircraft with varying parameters (e.g., interior configurations) so that design and performance curves may be developed to improve and optimize future installations of the wireless system of interest. This may benefit from continuous addition of data to the data storage 302 for analysis and comparison. In one example, a number of parameters of the wireless system of interest and/or configurations of the complex system may differ between a number (e.g., tens, hundreds, etc.) of tests, which may enable development of one or more rules to reduce if not minimize or exploit parameters of the wireless system of interest or complex system to improve performance.

Returning to FIG. 1, one or more wireless monitors 102 may be installed onboard a complex system in any of a number of different manners. In various examples, wireless monitor(s) may be installed in a non-intrusive configuration in which the monitor(s) may be segregated from the wireless system of interest, which may be installed or planned for installation onboard the complex system. This configuration may include two or more monitors installed onboard the complex system. Depending on the required sophistication, each wireless monitor may include all or only a portion of the functionality shown in FIG. 2. The wireless monitors in this configuration may be parasitic in that they may serve no other function than to collect data pertinent to analyzing the performance of the wireless system of interest.

In other examples, wireless monitor(s) 102 may be installed in an intrusive configuration in which the wireless monitor(s) may be integrated into and piggyback on an installed wireless system of interest. In this configuration, hardware of the wireless system of interest may in fact be configured to implement functionality of one or more wireless monitors in addition to functionality of the wireless system of interest itself. In various instances, then, this configuration may not require separately-installed wireless monitors, or may include additional, separately-installed wireless monitor(s). Instead, hardware of the wireless system of interest may be configured to operate in multiple modes including a "monitor mode" in which the hardware carries out the functionality of one or more wireless monitor(s). This configuration may therefore not be parasitic.

Example embodiments may be primarily described herein in the context of a non-intrusive configuration. It should be understood, however, that principles of the non-intrusive configuration may equally or similarly apply to the intrusive configuration.

In the non-intrusive configuration, wireless monitors 102 may be installed at one or more locations onboard a complex system in which a wireless system of interest is installed or planned for installation. In one example, the wireless monitors may be installed and arranged onboard the complex system in a manner that depends on the type of wireless system of interest and its radio access technology. As explained above, the wireless system of interest may be of any of a number of different types such as a WLAN, cellular, RFID, in-flight entertainment, emergency lighting, emerging aircraft health monitoring sensor system or the like, and the wireless system may include one or more wireless hardware components configured to operate in accordance with one or more of a number of different radio access technologies. These wireless hardware components may be configured to communicate with one another, and/or one or more other wireless hardware components external to the wireless system. The wireless monitors may therefore be installed at one or more locations onboard the complex system at which wireless hardware components of the wireless system of interest are installed or planned for installation, and/or at one or more locations of external wireless hardware components with which components of the wireless system of interest are configured to communicate.

Figure 4:
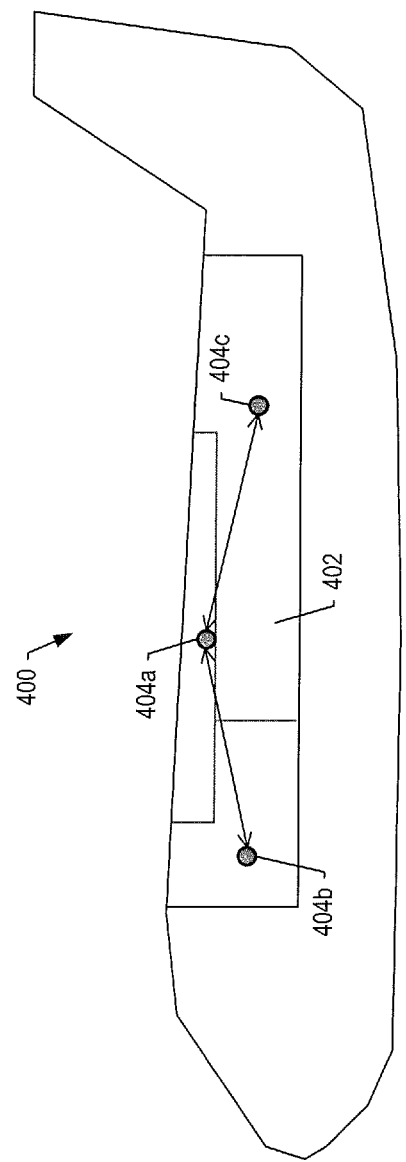
FIG. 4 is a schematic illustration of an aircraft including a number of wireless monitors installed onboard in accordance with one example embodiment.

FIG. 4 is a schematic illustration of an example aircraft 400 including a cabin 402 in which a WLAN system is installed or planned for installation. The WLAN system may include an appropriate wireless access point that may be accessed by one or more compatible wireless devices such as smartphones, tablet computers, laptop computers or the like. These types of devices may be brought onboard the aircraft and operated by passengers from different locations within the cabin while the aircraft is in service. As shown in FIG. 4, then, one wireless monitor 404a may be installed at a location above the ceiling where the WLAN access point is installed or planned for installation, and two other wireless monitors 404b, 404c may be installed at locations where seated passengers may access the respective access point. In this example, each wireless monitor may correspond to a wireless monitor 102 shown in FIG. 1.

In another example, similar to a WLAN system, a cellular system of interest may include a number of wireless devices brought onboard the aircraft and operated by passengers from different locations within the cabin while the aircraft is in service. This type of system may also include a respective access point onboard the aircraft. Similar to the installation shown in FIG. 4, in one example, for a cellular system of interest, one wireless monitor may be installed at a location above the ceiling which may emulate an appropriate access point, and a number of other wireless monitors may be installed at locations where seated passengers may operate wireless devices. Similar to the above, in this example, each wireless monitor may correspond to a wireless monitor 102 shown in FIG. 1. In yet another example, a RFID system onboard an aircraft may include RFID tags or readers at locations of emergency equipment (e.g., fire extinguishers, oxygen tanks, life vests, etc.), cargo, electrical equipment bay components, and the like. These tags or readers may be configured to communicate with one or more external tags and/or readers located throughout the aircraft. Wireless monitors 102 for this type of wireless system of interest may be installed at any one or more of these locations.

An in-flight entertainment system may include wireless hardware components at various locations throughout the cabin such as above the ceiling, in the headrests of passenger seats, underneath passenger seats or the like. Similarly, an emergency lighting system may include wireless hardware components at various locations throughout the cabin such as underneath passenger seats, by doors, above ceiling panels or the like. Wireless monitors 102 for these types of wireless system of interest may be installed at any one or more of these respective locations, and/or at any other location of external wireless hardware components with which these types of wireless systems are configured to communicate.

An emerging health monitoring sensor system such as an integrated vehicle health management (IVHM) system may include sensors located at various locations throughout the aircraft. In one example, an IVHM system may include temperature sensors (e.g., inside and/or outside the main cabin), strain gauges, tire pressure sensors, brake temperature sensors, smoke/fire detectors or the like, any one or more of which may be configured to communicate with external wireless hardware components. Wireless monitors 102 for this type of wireless system of interest may be installed at any one or more of these locations.

After installation, the wireless monitors 102 may be activated to collect data, such as at configurable, regular intervals. The wireless monitors may be configured to collect data in a number of different manners. In one example, the monitors may be configured to operate in a hub-and-spoke arrangement in which one designated monitor may be configured to function as a hub monitor responsible for interrogating and receiving responses from one or more other monitors configured to function as node monitors. In this arrangement, the node monitors may be configured to communicate with the hub monitor but may not communicate with each other. As shown in FIG. 4, for example, wireless monitor 404a may be configured to function as the hub monitor, and wireless monitors 404b, 404c may be configured to function as node monitors.

In one example, wireless monitors 102 in a hub-and-spoke arrangement may be configured to perform a connectivity check. The hub monitor may be configured to check connectivity of the node monitors to the hub monitor such as at regular intervals. The hub monitor may then be configured to record success or failure of the connectivity for each node monitor with an appropriate time stamp. In this regard, success or failure of a connectivity check may be determined based on the type of wireless system of interest and its radio access technology. For an RFID system of interest, for example, interrogated node monitors may reply with their respective identifiers (IDs), which the hub monitor may collect. For a WLAN system of interest, for example, interrogated node monitors may reply with their respective Internet Protocol (IP) addresses or other parameters, which the hub monitor may collect.

In one example, interrogated node monitors 102 may respond to a query from the hub monitor with sample data from which the quality of the communication link between the hub monitor and respective node monitors may also be determined. In this case, the hub monitor may be configured to request the sample data as in the connectivity check, and may evaluate the received sample data (or lack thereof) from each node to verify success. In another example, the hub monitor may be configured to calculate and record one or more additional communications characteristics regarding the node monitors.

In the hub-and-spoke arrangement, the data analysis system 104 may perform any of a number of different analyses of the data collected by the wireless monitors 102. In one example, the data analysis system may be configured to analyze the data to define where the hard boundary of coverage may be from the hub monitor's location. More particularly, for example, the data analysis system may be configured to determine how many meters away from the hub that the system may be expected to operate at a certain data rate (e.g., WLAN), how far away an RFID tag may be located and still be read, or the like. The analysis may include statistical estimates with probabilities assigned as a function of radius. The natural implications may be in determining an amount of required antennas or access points. If the number of anticipated access points or antennas may be reduced based on the analysis, the aircraft complexity and weight may be reduced.

In another example, the wireless monitors 102 may be configured to operate in a mesh arrangement in which hub and node monitors may be indistinguishable. Any monitor may be configured to function as a hub monitor or node monitor; or in other terms, any one or more monitors may be configured to selectively function as a hub monitor or node monitor. The mesh arrangement may enable collection of a larger amount of sampling data as the wireless monitors may communicate with one another as opposed to a singular hub monitor, which may enable multiple coverage estimates.

As shown in FIG. 4, for example, any of wireless monitors 404a, 404b, 404c may be configured to function as a hub monitor or node monitor, or may be configured to selectively function as a hub monitor and node monitor. For a WLAN system of interest, for example, any monitor may function as a hub monitor for interrogating other monitors as nodes to reply with their respective Internet Protocol (IP) addresses or other parameters, which the hub monitor may collect. In one example, the hub monitor may also be configured to transmit sample data to the hub monitors, and timestamp and log a successful transmission.

For an RFID system of interest, for example, each of a number of wireless monitors 102 may be configured to function as a reader or tag, or selectively function as a reader and tag, such as in accordance with the Electronic Product Code (EPC) standard. In a more particular example, a plurality of monitors may be configured to operate according to a test schedule of one or more cycles in which each monitor may be configured to function as a reader during a respective interval (e.g., 20 seconds).

In one example for an RFID system of interest, each of a plurality of wireless monitors 102 may be assigned a respective interval. During the interval of a monitor, it may function as a reader for interrogating and receiving responses from other monitors, which may function as tags. This interrogation of a tag monitor may include the reader monitor transmitting a query to the tag monitor. The tag monitor may timestamp and log receipt of the query, and may respond to the query with its ID. The reader monitor may receive, and timestamp and log responses from the tag monitors. At the end of the interval, and before or at the beginning of a next interval, the reader monitor may switch to function as a tag monitor, and a tag monitor assigned to the next interval may switch to function as the reader monitor. The process may then repeat for the next reader monitor, and may occur for each monitor of the plurality over a cycle. A test schedule may include one or more cycles, and in various instances, may occur over a period of seconds, to minutes, to hours to days or longer.

In the example in which the wireless monitors 102 may cycle between a reader and tags, several monitors may be distributed throughout the complex system. In the context of monitors distributed throughout the cabin of an aircraft, for example, for a reader monitor located in the aft of the cabin, tag monitors located in the rear of the cabin may be out of range of the reader monitor. But when the role of reader switches to a monitor located in the middle of the cabin, the forward-located tag monitors may begin responding. Thus, the entire volume of the cabin may be sampled providing meaningful data, including cargo and electrical equipment bay.

For a test sequence carried out over several hours, the data collected by the wireless monitors 102 may provide enough information to statistically quantify the probability of successful communication as a function of distance in the cabin (one example of a parameter of interest). Furthermore, in instances in which the test sequence is carried out during a test flight, performance of the RFID system of interest may be analyzed for changes in normal operating conditions. For example, the collected data may be analyzed to determine if an RFID reader of the RFID system will operate as well on the flight line (in the presence of many potential interference sources) as it does in flight over a remote area where no interference is expected.

While the above example highlights use of the wireless monitors 102 in the context of an RFID system of interest, similar test sequencing and monitoring functions may be tailored for other wireless systems of interest. The monitors may be flexible in that they may be reconfigured to emulate any of a number of different wireless systems of interest. In some instances it may be valuable to understand the impact of performance on multiple radio access technologies with moving passengers. In these instances, the wireless monitors may be installed onboard the aircraft at somewhat arbitrary locations, and may be configured to collect data in a manner that monitors multiple different systems of interest in the presence of a dynamic environment.

In other instances, impact of cabin configuration (e.g., layout of passenger accommodations, interiors, seats, etc.) on one or more wireless systems of interest may drive installation and operation of the wireless monitors 102 to collect data. In these instances, the monitors may be configured to collect data for only the radio access technologies of the wireless systems of interest. In yet other instances, interference may be a focus, and it may be desirable to have the monitors split in function between multiple wireless systems of interest, and simultaneously operated to collect data. For example, using the flexible and reconfigurable nature of the monitor, its operation may be configured to collect data for analysis of the impact of different wireless systems operating in the presence of each other in a shared spectrum. In this case, monitors in the main cabin may be configured to employ MIMO technology for a planned in-flight entertainment system of interest, while other monitors in the cargo bay may be configured to communicate in accordance with Zigbee, Bluetooth or the like for a planned emerging health monitoring sensor system of interest.

Figure 5:
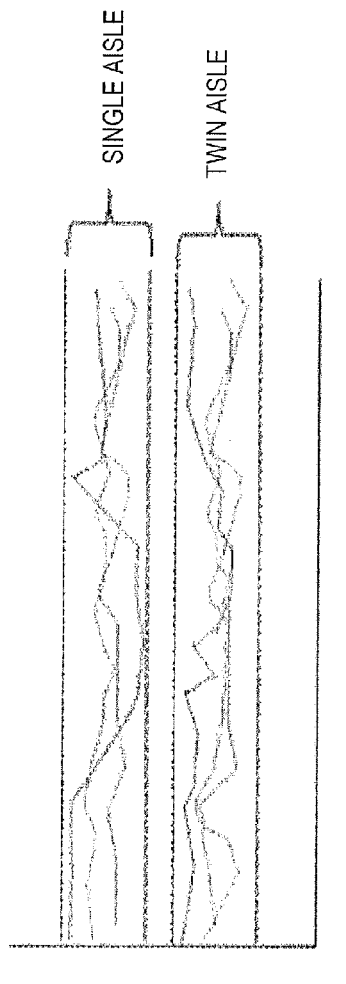
FIGS. 5, 6 and 7 are graphs of data analyses that may be performed according to example embodiments.

In one example, in order to quantify the differences between large and small cabins, a test may be run with standard of the wireless monitors 102 onboard an aircraft. In this case, a hub monitor may be installed in the front of the main cabin above a ceiling panel, and a node monitor may be installed in the middle of the cabin under a seat. In this test, the monitors may be installed and data collected for a number of single aisle and twin aisle aircraft (parameters of different configurations). The data may be passed to the data analysis system 104, which may filter and trim the data in time so that operating conditions of the aircraft (e.g., in-flight with passengers generally free to move around) may be the same across the aircraft. FIG. 5 illustrates a graph that provides a notional comparison of three aircraft of each configuration. The vertical axis shows power, but it could instead show any of a number of other parameters such as BER, SNR, data rate or the like. These settings may have been defined before the test and guided the data collected by the wireless monitors.

The results shown in FIG. 5 indicate that the wireless system of interest onboard each aircraft may perform differently due to any number of factors (e.g., interior layout), but on average the single aisle configuration may provide higher power levels than the twin aisle configuration. If the wireless system of interest onboard a 787 aircraft were replicated on a smaller platform such as the 737 aircraft, these results show that it may work.

Figure 6:
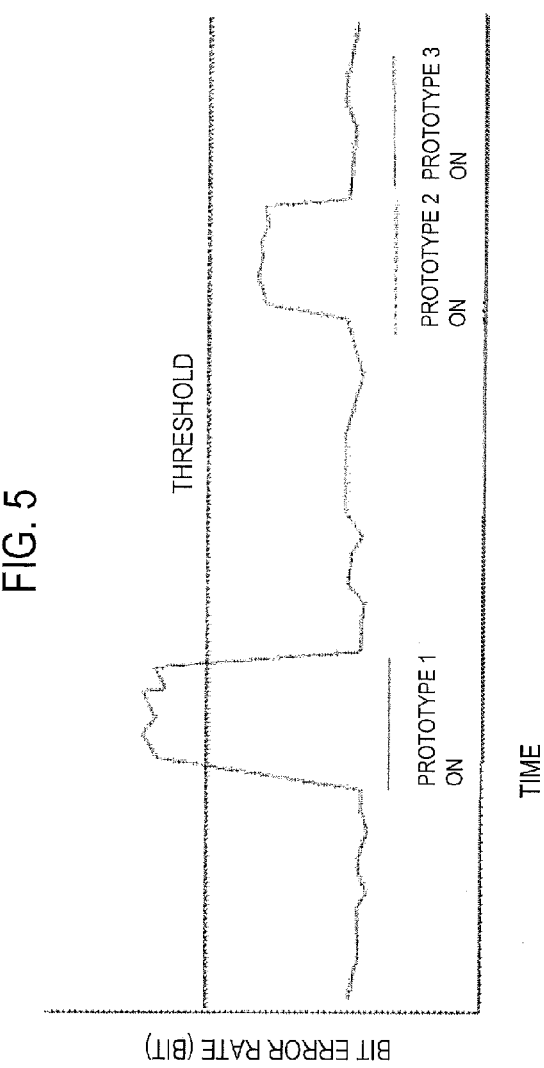

In another example, consider a new wireless system such as an in-flight entertainment system is to be installed in a cabin that already has another wireless system such as an emergency lighting system installed. A test may be put together to assess the potential of interference. FIG. 6 illustrates a graph resulting from analysis of data collected during the test. The curve shows BER for two wireless monitors 102 installed in an emergency lighting operating mode (e.g., 2.4 GHz, Zigbee radios) to emulate the emergency lighting system. These monitors may more particular emulate for example one overhead receiver (e.g., exit sign) and an under-seat mounted controller of the emergency lighting system. The vertical axis shows BER output of the receiver during a test for a single aircraft. Performance below the threshold is expected. As shown, prototypes 1, 2 and 3 represent different configurations of the new in-flight entertainment system. The results indicate prototype 1 introduces unacceptable interference, prototype 2 is marginally compatible, and prototype 3 is fully compatible. Much larger sample sets may be desired to make proper engineering decisions on which prototype is best or if others should be explored.

Figure 7:
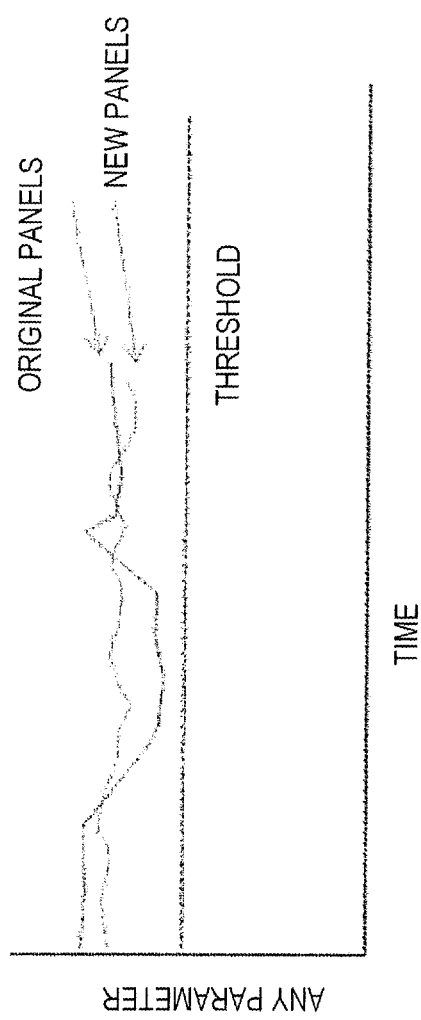

In yet another example, the impact of different aircraft interiors may be evaluated. Using two wireless monitors 102 as a hub monitor and node monitor, for example, the focus may be on ceiling and stow bin change. The hub monitor may be installed above the ceiling panel in the same relative location on each tested aircraft. The node monitor may be arbitrarily installed in a fixed location on the other side of the ceiling panel, and its relative location may be fixed for each aircraft test. As shown in the graph of FIG. 7, two large sample sets may be taken. The first sample set may be from multiple tests in the original ceiling panel configuration, and the second set may be from multiple tests in the new ceiling panel/stow bin configuration. By comparing the two sample sets, it may be seen that the new ceiling/stow bin type has no appreciable impact on performance. The vertical axis may be any measurable parameter enabled by the wireless monitors. The measured parameters may be defined at the beginning of the test, and may guide the data collection by the monitors.

In yet another example, the impact of different aircraft interiors may be evaluated. Using two wireless monitors 102 as a hub monitor and node monitor, for example, the focus may be on ceiling and stow bin change. The hub monitor may be installed above the ceiling panel in the same relative location on each tested aircraft. The node monitor may be arbitrarily installed in a fixed location on the other side of the ceiling panel, and its relative location may be fixed for each aircraft test. As shown in the graph of FIG. 7, two large sample sets may be taken. The first sample set may be from multiple tests in the original ceiling panel configuration, and the second set may be from multiple tests in the new ceiling panel/stow bin configuration. By comparing the two sample sets, it may be seen that the new ceiling/stow bin type has no appreciable impact on performance. The vertical axis may be any measurable parameter enabled by the wireless monitors. The measured parameters may be defined at the beginning of the test, and may guide the data collection by the monitors. In one example, the parameter may be power, and the graph may show performance above a threshold. Analysis of a different parameter such as fade depth, however, may reveal that threshold may not be met for a specific wireless system of interest and radio access technology.

According to example embodiments of the present disclosure, the wireless performance testing system 100 and its subsystems including the wireless monitor(s) 102 and data analysis system 104 may be implemented by various means. Similarly, the examples of a wireless monitor 200 and data analysis system 300, including each of their respective elements, may be implemented by various means according to example embodiments. Means for implementing the systems, subsystems and their respective elements may include hardware, alone or under direction of one or more computer program code instructions, program instructions or executable computer-readable program code instructions from a computer-readable storage medium.

In one example, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary embodiments of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 8:
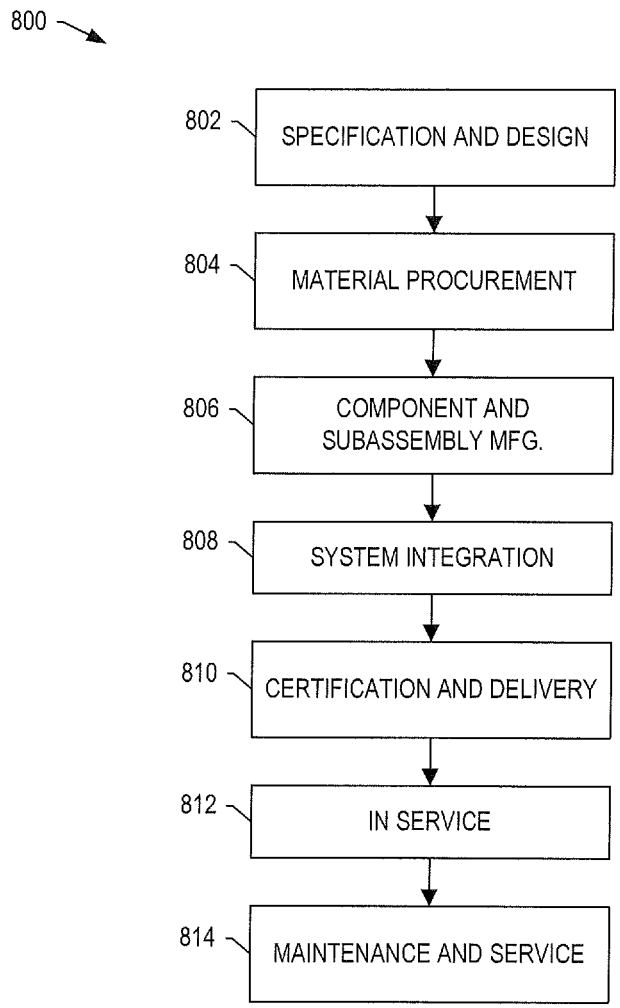
FIG. 8 is a flow diagram of an example aircraft production and service methodology.
Figure 9:
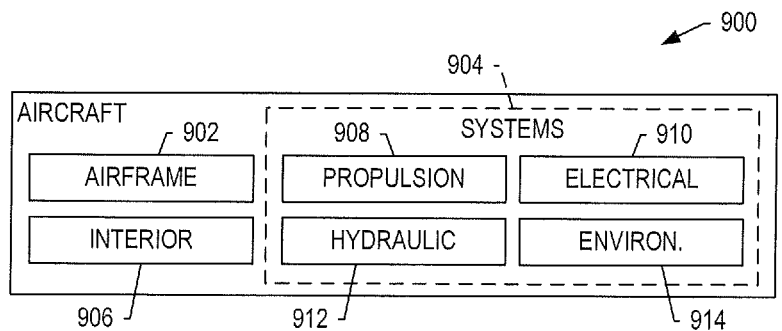
FIG. 9 is a block diagram of an example aircraft.

Example embodiments of the present disclosure may find use in a variety of potential applications, particularly in the transportation industry, including for example, aerospace, marine and automotive applications. Thus, referring now to FIGS. 8 and 9, example embodiments may be used in the context of an aircraft manufacturing and service method 800 as shown in FIG. 8, and an aircraft 900 as shown in FIG. 9. During pre-production, example method may include specification and design 802 of the aircraft and material procurement 804. The disclosed apparatus and method may be used in the design of a wireless system of interest for installation onboard the aircraft, and may be used on prior manufactured aircraft to collect and analyze data that may guide the design. During production, component and subassembly manufacturing 806 and system integration 808 of the aircraft takes place. Thereafter, the aircraft may go through certification and delivery 810 in order to be placed in service 812. While in service by a customer, the aircraft is scheduled for routine maintenance and service 814 (which may also include modification, reconfiguration, refurbishment, and so on). The disclosed apparatus and method may also be used during production and/or service of the aircraft, and may be used onboard the aircraft being produced.

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization and so on.

As shown in FIG. 9, the aircraft 900 produced by example method 800 may include an airframe 902 with a plurality of systems 904 and an interior 906. Examples of high-level systems may include one or more of a propulsion system 908, an electrical system 910, a hydraulic system 912 or an environmental system 914. Any number of other systems may be included, including any of the aforementioned wireless systems of interest. Although an aerospace example is shown, the principles of the present disclosure may be applied to other industries, such as the automotive industry.

As suggested above, the apparatus and methods embodied herein may be employed during any one or more of the stages of the production and service method 800. For example, components or subassemblies corresponding to production process 806 may be fabricated or manufactured in a manner similar to components or subassemblies produced while the aircraft 900 is in service. Also, one or more apparatus embodiments, method embodiments or a combination thereof may be utilized during the production stages 806 and 808, for example, by substantially expediting assembly of or reducing the cost of an aircraft. Similarly, one or more of apparatus embodiments, method embodiments or a combination thereof may be utilized while the aircraft is in service, for example and without limitation, to maintenance and service 814.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
installing one or more of a plurality of wireless monitors at respective locations onboard a configuration of a complex system on which a wireless system of interest is installed or planned for installation, the complex system being an aircraft or other vehicle, the configuration of the complex system including an at least partially defined configuration of an interior of the aircraft or other vehicle;
emulating the wireless system of interest, and recording data related to performance of the wireless system of interest at one or more recorded times over a plurality of operating conditions of the complex system;
collecting data including the respective locations of the wireless monitors correlated with respective recorded data and recorded times, and further correlated with the plurality of operating conditions of the complex system at the recorded times, the wireless system of interest being emulated, the data recorded and collected by the plurality of wireless monitors;
performing an analysis of the wireless system of interest based on the collected data, the analysis being performed by a data analysis system to establish a configuration of the wireless system of interest that meets or exceeds at least one design requirement thereof, the data analysis system computing whether the configuration or operating conditions of the complex system enable the wireless system of interest to perform with a wireless link quality specified by the at least one design requirement.

2. The method of claim 1 further comprising by the plurality of wireless monitors:
receiving or calculating one or more parameters that at least partially define the configuration of the wireless system of interest, or one or more parameters that at least partially define the configuration of the complex system,
wherein the collecting of data further includes collecting the one or more parameters of the wireless system of interest or complex system, the collected data further including the one or more parameters of the wireless system of interest or complex system.

3. The method of claim 1, wherein the installing comprises installing the wireless monitors such that the wireless monitors are segregated from the wireless system of interest.

4. The method of claim 1, wherein the installing comprises installing the wireless monitors such that the wireless monitors are integrated into and piggyback on the wireless system of interest installed on the complex system.

5. The method of claim 1, wherein the wireless system of interest includes wireless hardware components, and
wherein the installing comprises installing the wireless monitors at one or more locations onboard the complex system at which the wireless hardware components are installed or planned for installation, or at one or more locations of external wireless hardware components with which the wireless hardware components are configured to communicate.

6. The method of claim 1, wherein the collecting of data includes collecting data in a hub-and-spoke arrangement in which one designated wireless monitor functions as a hub monitor responsible for interrogating and receiving responses from one or more other wireless monitors functioning as node monitors.

7. The method of claim 1, wherein the collecting of data includes collecting data in a mesh arrangement in which one or more of the wireless monitors selectively function as a hub monitor or node monitor, the hub monitor being responsible for interrogating and receiving responses from one or more node monitors.

8. The method of claim 1, wherein the installing, emulating and collecting occur for a plurality of different configurations of the complex system, each configuration being at least partially defined by parameters one or more of which differ for different configurations.

9. The method of claim 1, wherein the installing, emulating and collecting occur for a plurality of different configurations of the wireless system of interest, each configuration being at least partially defined by parameters one or more of which differ for different configurations.

10. A wireless monitor of a plurality of wireless monitors installable at respective locations onboard a configuration of a complex system on which a wireless system of interest is installed or planned for installation, the complex system being an aircraft or other vehicle, the configuration of the complex system including an at least partially defined configuration of an interior of the aircraft or other vehicle, the wireless monitor comprising:
   a radio;
   a control module coupled to the radio and configured to control the radio to emulate the wireless system of interest, and record data related to performance of the wireless system of interest at one or more recorded times over a plurality of operating conditions of the complex system, wherein the control module being configured to record data includes being configured to calculate a wireless link quality at the one or more recorded times over the plurality of operating conditions; and
   a data storage coupled to the control module and configured to store the respective location of the wireless monitor correlated with the recorded data and recorded times, and further correlated with the plurality of operating conditions of the complex system at the recorded times, the plurality of wireless monitors being configured to collect data including the respective locations, and respective recorded data and recorded times, the collected data for the plurality of wireless monitors being retrievable for analysis of the wireless system of interest based thereon,
   wherein the analysis enables establishment of a configuration of the wireless system of interest that meets or exceeds at least one design requirement thereof, the analysis including computing, based on the calculated wireless link quality, whether the configuration or operating conditions of the complex system enable the wireless system of interest to perform with a wireless link quality specified by the at least one design requirement.

11. The wireless monitor of claim 10, wherein the control module is further configured to receive or calculate one or more parameters that at least partially define the configuration of the wireless system of interest, or one or more parameters that at least partially define the configuration of the complex system, and
   wherein the data storage is further configured to store the one or more parameters of the wireless system of interest or complex system, the collected data further including the one or more parameters of the wireless system of interest or complex system.

12. The wireless monitor of claim 10, wherein the radio comprises:
   a radio stack comprising a software-defined radio system configured to implement one or more radio access technologies of a respective one or more wireless systems including the wireless system of interest; and
   a radio frequency and sounding layer configured to operate to cause transmission of, receive and measure one or more network parameters of one or more waveforms via one or more antennas.

13. The wireless monitor of claim 12, wherein the control module comprises:
   a channel model constructor configured to construct one or more wireless channel models according to which the radio frequency and sounding layer is configured to operate; and
   a link quality evaluator configured to calculate the wireless link quality based on the one or more network parameters measured by the radio frequency and sounding layer.

14. The wireless monitor of claim 10, wherein the wireless monitor is installable onboard different configurations of the complex system, each configuration being at least partially defined by parameters one or more of which differ for different configurations,
   wherein the control module is configured to record data and the data storage is configured to store the recorded data for each configuration, the plurality of wireless monitors further being configured to collect data for each configuration.

15. The wireless monitor of claim 10, wherein the control module is configured to control the radio to emulate different configurations of the wireless system of interest, each configuration being at least partially defined by parameters one or more of which differ for different configurations,
   wherein the control module is configured to record data and the data storage is configured to store the recorded data for each configuration, the plurality of wireless monitors further being configured to collect data for each configuration.

16. A data analysis system comprising:
   a data storage configured to store a collection of data from a plurality of wireless monitors installable at respective locations onboard a configuration of a complex system on which a wireless system of interest is installed or planned for installation, the complex system being an aircraft or other vehicle, the configuration of the complex system including an at least partially defined configuration of an interior of the aircraft or other vehicle, the wireless monitors being configured to emulate the wireless system of interest, and record data related to performance of the wireless system of interest at one or more recorded times over a plurality of operating conditions of the complex system, the collection of data including the respective locations of the wireless monitors correlated with respective recorded data and recorded times, and further correlated with the plurality of operating conditions of the complex system at the recorded times; and
   a data analyzer coupled to the data storage and configured to perform an analysis of the wireless system of interest based on the collection of data, the analysis being performed to establish a configuration of the wireless system of interest that meets or exceeds at least one design requirement thereof, the data analyzer being configured to compute whether the configuration or operating conditions of the complex system enable the wireless system of interest to perform with a wireless link quality specified by the at least one design requirement.

17. The data analysis system of claim 16, wherein collection of data further includes one or more parameters that at least partially define the configuration of the wireless system of interest, or one or more parameters that at least partially define the configuration of the complex system.

18. The data analysis system of claim 16, wherein the wireless monitors are installable onboard different configurations of the complex system, each configuration being at least partially defined by parameters one or more of which differ for different configurations,
   wherein the data storage is configured to store a collection of data for each configuration, and the data analyzer is configured to retrieve each collection of data for analysis of the wireless system of interest based thereon.

19. The data analysis system of claim 16, wherein the wireless monitors are configured to emulate different configurations of the wireless system of interest, each configuration being at least partially defined by parameters one or more of which differ for different configurations,
   wherein the data storage is configured to store a collection of data for each configuration, and the data analyzer is configured to retrieve each collection of data for analysis of a respective configuration of the wireless system of interest based thereon.

\* \* \* \* \*